United States Patent
Tsai

(10) Patent No.: US 7,108,243 B2
(45) Date of Patent: Sep. 19, 2006

(54) BALL VALVE

(76) Inventor: Chi-Lung Tsai, No. 16, Hsing Chung 1st Road, Lingya Area, Kaohsiung County (TW)

( * ) Notice: Subject to any disclaimer, the term of this patent is extended or adjusted under 35 U.S.C. 154(b) by 0 days.

(21) Appl. No.: 10/920,954

(22) Filed: Aug. 19, 2004

(65) Prior Publication Data

US 2006/0038152 A1 Feb. 23, 2006

(51) Int. Cl.
*F16K 5/06* (2006.01)
(52) U.S. Cl. ............... 251/317; 251/315.01; 251/315.1
(58) Field of Classification Search ............. 251/315.1, 251/317, 315.13, 315.15, 315.16; 137/15.22
See application file for complete search history.

(56) References Cited

U.S. PATENT DOCUMENTS 3,157,190 A * 11/1964 Allen ..................... 137/330
3,501,128 A * 3/1970 Pool ........................... 251/175
4,602,762 A * 7/1986 Koch et al. ................. 251/174
4,637,421 A * 1/1987 Stunkard ..................... 137/327

* cited by examiner

*Primary Examiner*—J. Casimer Jacyna

(57) ABSTRACT

A ball valve includes a housing, a valve member, and a grip. The housing has a valve chamber in the center portion for containing a valve portion of the valve member consisting of the valve portion and a shaft portion extending up from the valve portion and out of the housing to combine with the grip able to rotate the valve member to open or close a passageway formed by the cavity of the valve portion, an inlet portion and an outlet portion at two sides of the housing. An anti-leak gasket is fixed around the lower end of the shaft for preventing liquid in the valve assembly from leaking out. Further, a soft auxiliary gasket is fixed around the shaft portion under the anti-leak gasket for lessening friction between the shaft portion and the shaft hole of the housing to permit the ball valve manually handled to open or close smoothly.

5 Claims, 4 Drawing Sheets

BALL VALVE

FIELD OF THE INVENTION

This invention relates to a ball valve, particularly to one provided with a valve member consisting of a valve portion and a shaft portion extending up from the valve portion, which is contained in a valve chamber in the center portion of a housing also having an inlet portion and an outlet portion formed at two sides. Then the shaft portion is fixed with a soft auxiliary gasket under an anti-leak gasket also fixed around the lower end of the shaft portion to prevent liquid from leaking through the gap between the shaft portion and shaft hole of the housing and facilitate the valve member rotated by manual handling of a grip combined tightly with an upper end of the shaft portion in opening or closing the ball valve.

BACKGROUND OF THE INVENTION

A conventional ball valve shown in FIGS. 1 and 2 includes a housing 1, a valve member 2, and a grip 22. The housing 1 is provided with a valve chamber 10 in the center 12 portions and an inlet portion 11 and an outlet portion respectively at two sides of the valve chamber 10 and a shaft hole 13 formed in an upper center portion.

The valve member 2 consists of a valve portion and a shaft portion 21 extending up from the valve portion, and the valve portion has a cavity 20 to align or not to align to the inlet portion 11 and the outlet portion 12 so that the valve portion together with the shaft portion 21 may be rotated by the grip 22 fitted with the upper end of the shaft portion 21 for opening and closing the ball valve. The shaft portion 21 has an anti-leak gasket fixed around the lower end of the shaft portion to prevent liquid in the ball valve from leaking through the gap between the shaft portion and the shaft hole of the housing 1. In fabricating the ball valve, the valve member is formed in advance, and then placed in a mold for injecting molding the housing 1 to combine the valve member 2 in the housing 1.

However, In the molding process of the housing 1, the mold is heated up to a high temperature of about 200° C. to produce some damage to the outer surface of the valve member 2, so the contact areas of the shaft portion 21 with a coarse rough surface 210 and the shaft hole 13 may not be very close enough as they should be for anti-leakage. Moreover, the coarse surface 210 of the shaft portion 21 may cause extremely large friction to hamper smooth rotation of the valve member 2 in opening and closing the ball valve, affecting the service life of the ball valve.

A valve assembly disclosed in two U.S. Pat. No. 5,865,210 and U.S. Pat. No. 4,088,299 includes a body 10 and a valve closure member 14 separately formed and combined together. So they have a flaw of complicated manufacturing processes, expensive cost, with a structure different from the ball valve in this invention.

Next, another U.S. Pat. No. 6,189,860B1 tilted "PLASTIC BUTTERFLY VALVE" includes a hollow cylindrical body 1 and a valve disk 4, which are separately fabricated and then combined together. This valve also has the same drawback of complicated manufacturing processes, expensive cost, and a structure different from the ball valve in this invention.

SUMMARY OF THE INVENTION

The purpose of the invention is to offer a ball valve provided with a soft auxiliary gasket fitted around a shaft portion of a valve member to reduce friction between a shaft hole of a housing and the shaft portion for smoothing opening and closing of the ball valve.

A first feature of the invention is a housing formed integral and having a valve chamber in its center portion for containing a valve portion of the valve member and an inlet portion and an outlet portion at two sides of the valve chamber to align or completely not to align with the cavity of the valve portion for opening and closing the ball valve.

A second feature of the invention is a shaft portion formed to extend up from the valve portion of the valve member and protruding out of an upper center wall of the housing to combine tightly with a grip so that the grip can rotate the shaft portion together with the valve portion to align the cavity of the valve portion with the inlet portion and the outlet portion for liquid to pass through or not to align them for interrupting the passage of liquid through the ball valve.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
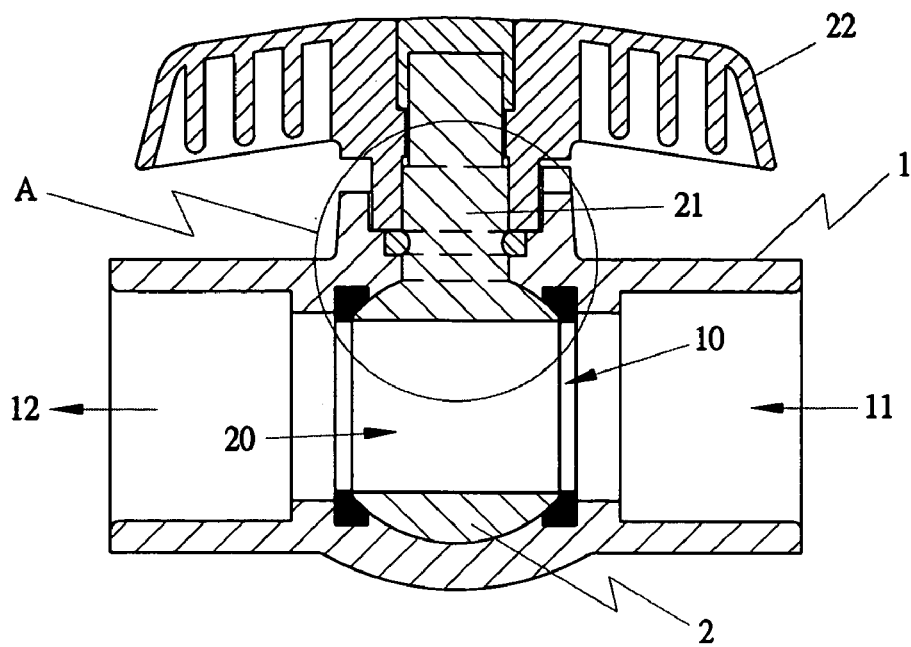
FIG. 1 is a cross-sectional view of a conventional ball valve.
Figure 2:
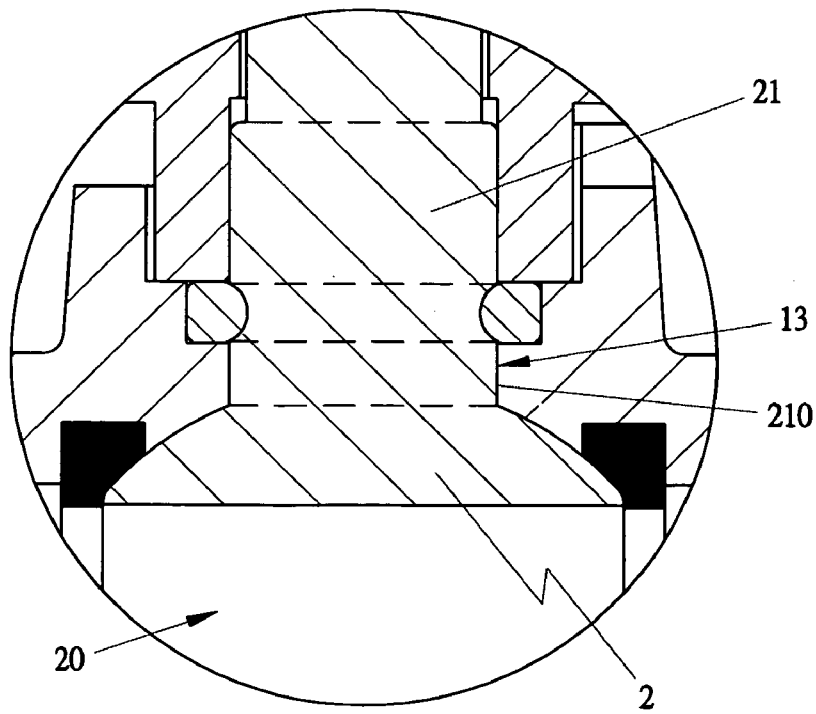
FIG. 2 is a magnified cross-sectional view of the part marked (A) in FIG. 1.
Figure 3:
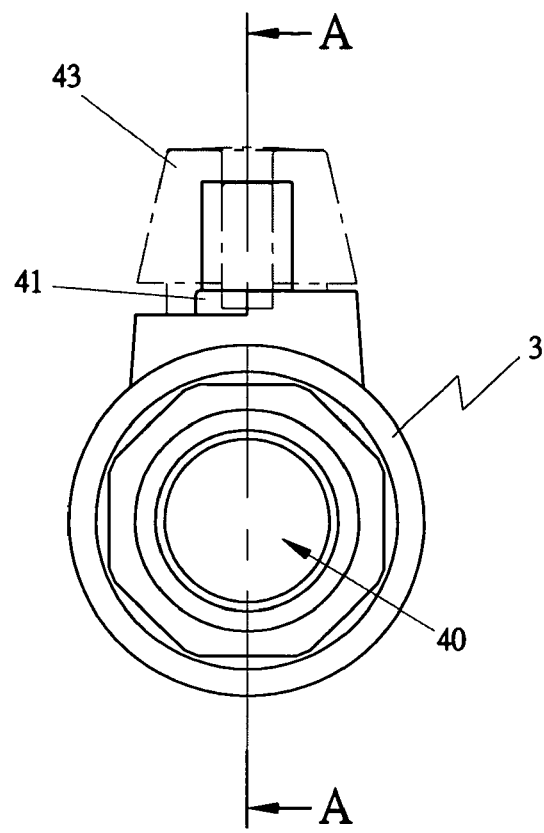
FIG. 3 is a side view of a ball valve in the present invention.
Figure 4:
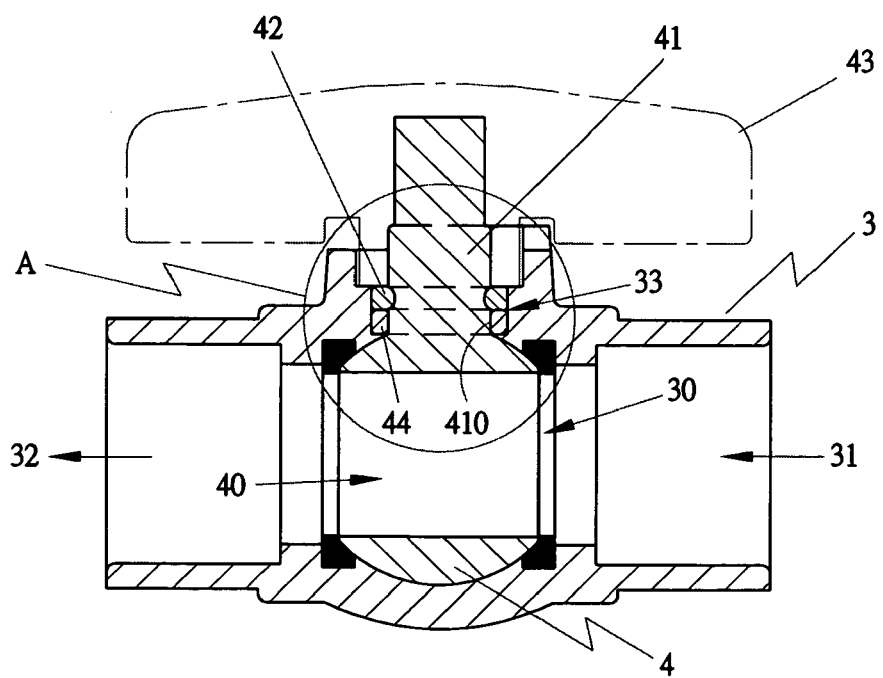
FIG. 4 is a cross-sectional view of the line A$_N$ A in FIG. 3.
Figure 5:
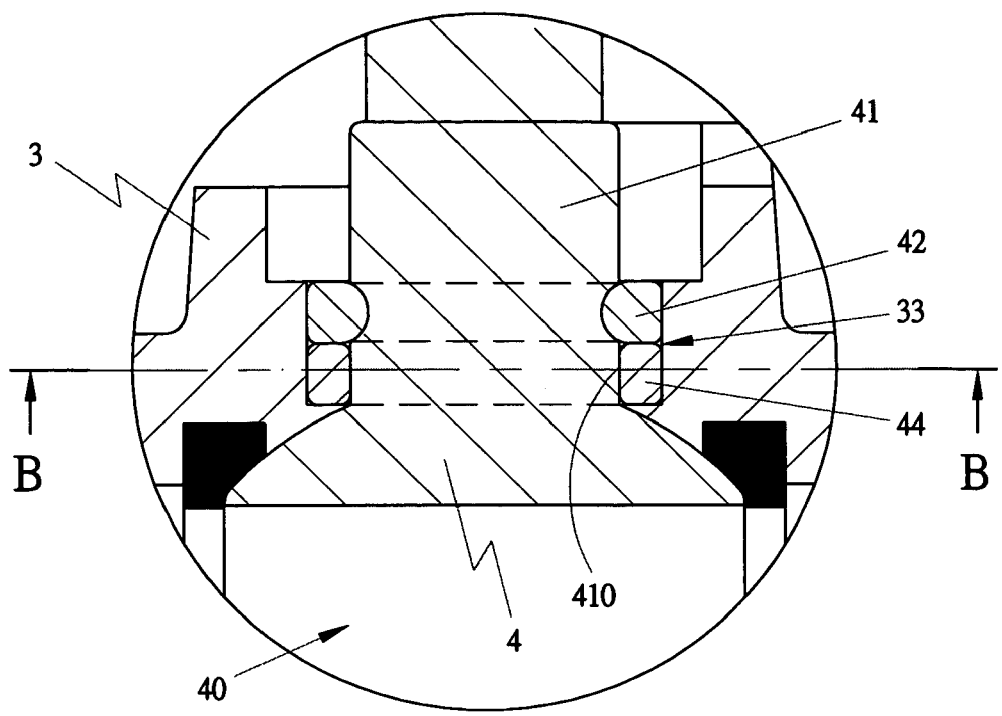
FIG. 5 is a magnified cross-sectional view of the part market (A) in FIG. 4.

A preferred embodiment of a ball valve in the present invention, as shown in FIGS. 3, 4 and 5, includes a housing 3, a valve member 4 and a grip 43 as main components.

The housing 3 is fabricated as integral, having a valve chamber 30 formed in its center portion, an inlet portion 31 and an outlet portion 32 formed at two sides of the valve chamber 30 and a shaft hole 33 in an upper center wall.

The valve member 4 has a valve portion and a shaft portion 41 extending up from the valve portion to pass upward through the shaft hole 33 of the housing 3. The valve portion has a cavity 40 to be able to align or not to align to the inlet portion 31 and the outlet portion 32 for liquid to flow therethrough or to be stopped. Then the shaft portion 41 has its upper end combined tightly with the grip 43, which can rotate manually the shaft portion 31 in the shaft hole 33 so that the valve portion may be also rotated from an open position wherein the cavity 40 is aligned to the inlet portion 31 and the outlet portion 32 to a closed position wherein the cavity 40 is completely not aligned to the inlet and the outlet portion by 90 degrees' rotation of the grip 43, in other words the ball valve is closed to block flowing of liquid. Further, an anti-leak gasket 42 is fixed around a partial surface 410 in the lower end of the shaft portion 41 for preventing liquid from flowing or seeping through the gap between the shaft portion 41 and the shaft hole 33. In addition, a soft auxiliary gasket 44 is also fixed around the partial surface 410 of the shaft portion 41 under the anti-leak gasket 42 as shown in FIGS. 5 and 6.

Thus, the valve portion of the valve member 4 can be rotated together with the shaft portion 41 by manual rotation of the grip 43 to open or close the passageway consisting of the cavity 40 of the valve member 4 and the inlet porting 31 and the outlet portion 32 of the housing 3, that is, to open and close the ball valve.

Figure 7:
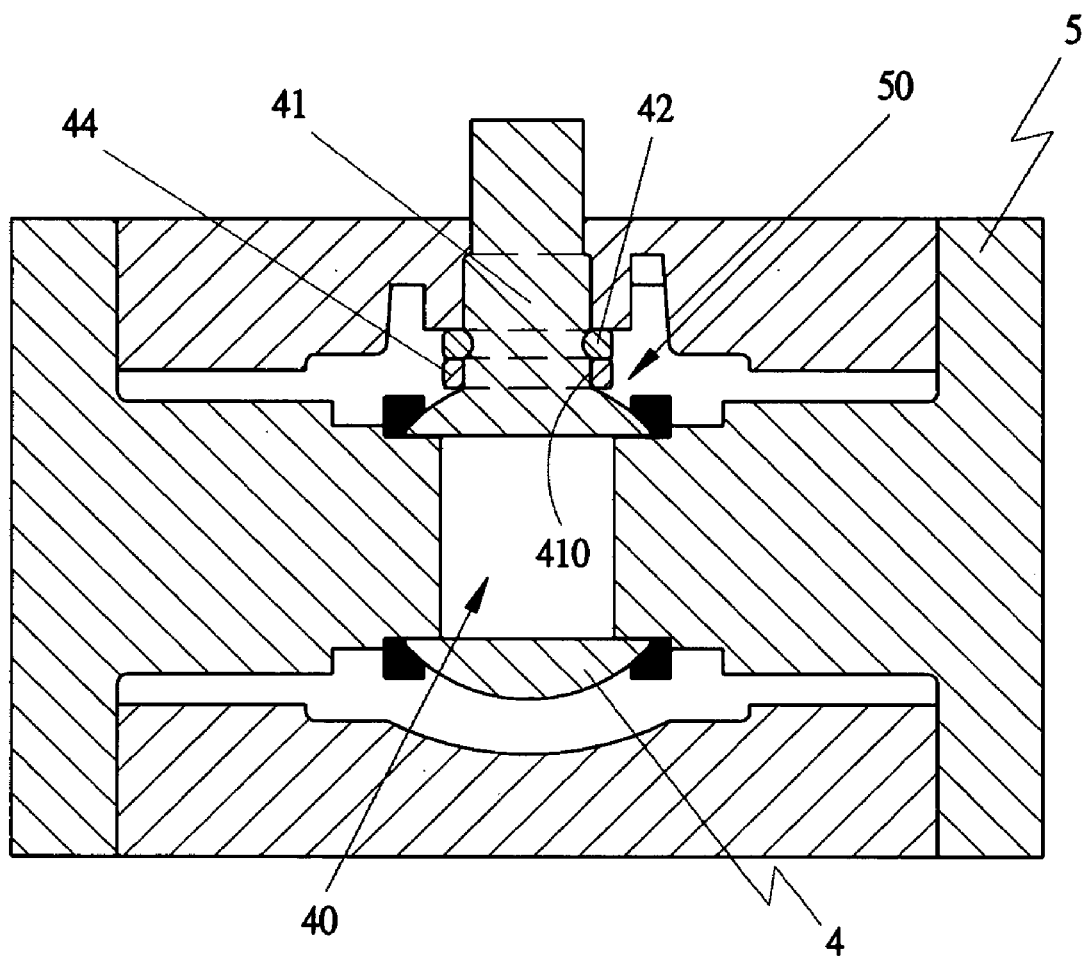
FIG. 7 is a cross-sectional view of a valve member placed in a mold for molding a housing in the present invention.

In assembling, the valve member 4 is in advance fabricated, and then placed in a cavity 50 of a mold 5 for injecting molding a housing 3, as shown in FIG. 7. After the housing 3 is finished in molding, then the valve member 4 is also contained in the housing 3 as integral.

Figure 6:
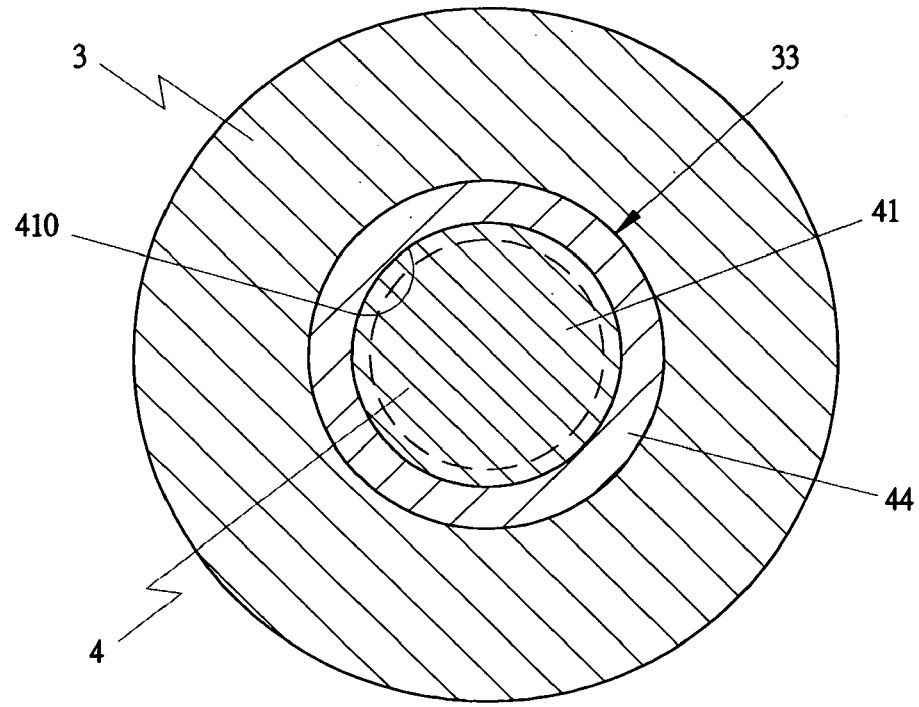
FIG. 6 is a cross-sectional view the line B$_N$ B in FIG. 4.

In the molding process of the housing 3, although the mold 5 is heated to a high temperature of about 200° C., the partial surface 410 of the shaft portion 41 has been covered and protected by the soft gasket 42 and the shaft hole 33 of the housing 3, as shown in FIG. 6, impossible to be damaged by the high temperature of the mold 5. Further, the soft gasket 44 can reduce the friction in a gap between the shaft hole 33 and the shaft portion 41 in spite of compressing of the inner surface of the shaft hole 33 against the soft gasket 44. Therefore, rotation of the grip 43 can close and open the ball valve with smoothness, enabling the ball valve have a long service life.

While the preferred embodiment of the invention has been described above, it will be recognized and understood that various modifications may be made therein and the appended claims are intended to cover all such modifications that may fall within the spirit and scope of the invention.

What is claimed is:

1. A ball valve comprising:

a housing integrally provided with a valve chamber in its center portion, an inlet portion and an outlet portion for liquid respectively formed at two sides of said valve chamber, and a shaft hole formed in an upper center wall just above said valve chamber;

a valve member having a valve portion and a shaft portion extending up from said valve portion, said valve portion having a cavity able to align or not to align to said inlet portion and said outlet portion of said housing so as to form or not to form a passageway for liquid to flow through said inlet portion first and then through said cavity of said valve portion and then out of said outlet portion of said housing; said shaft portion extending up from said valve portion and through said shaft hole of said housing to protrude out to combine tightly with a grip, an anti-leak gasket fixed around a lower end of said shaft portion for preventing liquid from flowing or seeping through a gap between said shaft portion and said shaft hole of said housing, a soft gasket fixed around said shaft portion under said anti-leak gasket;

said grip possible to rotate said shaft portion together with said valve portion of said valve member in said housing for opening and closing said ball valve, and said soft gasket reducing friction between said shaft portion and said shaft hole to smooth the opening and closing action of said ball valve;

wherein an outer dimension of said valve portion is larger than an inner dimension of said inlet portion, larger than an inner dimension of said outlet portion, and larger than an inner dimension of said shaft hole, and wherein said shaft portion is not in direct contact with a side wall of said shaft hole.

2. The ball valve of claim 1, wherein said valve portion is integral with said shaft portion of said valve member.

3. A ball valve comprising:

a housing integrally provided with a valve chamber in its center portion, an inlet portion and an outlet portion respectively formed at two sides of said valve chamber, and a shaft hole formed in an upper wall above said valve chamber;

a valve member having a valve portion and a shaft portion extending up from, and integral with, said valve portion, said valve portion having a cavity able to align or not to align to said inlet portion and said outlet portion of said housing so as to form or not to form a passageway for liquid to flow through said inlet portion, said cavity of said valve portion, and said outlet portion of said housing; said shaft portion extending up from said valve portion and through said shalt hole of said housing;

an anti-teak gasket fixed around a lower end of said shaft portion; and a soft gasket fixed around said shaft portion under said anti-leak gasket;

wherein an outer dimension of said valve portion is larger than an inner dimension of said shaft hole, and wherein said shaft portion is not in direct contact with a side wall of said shaft hole.

4. The ball valve of claim 3, further comprising a grip connected to an upper end of said shaft portion for rotating said shalt portion together with said valve portion of said valve member in said housing for opening and closing said ball valve, and said soft gasket reducing friction between said shaft portion and said shaft hole to smooth the opening and closing action of said ball valve.

5. The ball valve of claim 3, wherein the outer dimension of said valve portion is larger than an inner dimension of said inlet portion and larger than an inner dimension of said outlet portion.

\* \* \* \* \*